United States Patent
Denteneer et al.

(10) Patent No.: US 7,961,721 B2
(45) Date of Patent: Jun. 14, 2011

(54) ROUTER, NETWORK COMPRISING A ROUTER, METHOD FOR ROUTING DATA IN A NETWORK

(75) Inventors: Theodorus Jacobus Denteneer, Eindhoven (NL); Ronald Rietman, Eindhoven (NL); Santiago Gonzalez Pestana, Veldhoven (NL); Nick Boot, Eindhoven (NL); Ivo Jean-Baptiste Adan, Eindhoven (NL)

(73) Assignee: NXP B.V., Eindhoven (NL)

(*) Notice: Subject to any disclaimer, the term of this patent is extended or adjusted under 35 U.S.C. 154(b) by 382 days.

(21) Appl. No.: 11/817,323

(22) PCT Filed: Feb. 21, 2006

(86) PCT No.: PCT/IB2006/050559
§ 371 (c)(1),
(2), (4) Date: Oct. 24, 2008

(87) PCT Pub. No.: WO2006/090332
PCT Pub. Date: Aug. 31, 2006

(65) Prior Publication Data
US 2009/0213863 A1    Aug. 27, 2009

(30) Foreign Application Priority Data
Feb. 28, 2005   (EP) .................................. 05101524

(51) Int. Cl.
*H04L 12/50*    (2006.01)
*H04L 12/28*    (2006.01)
*H04L 12/56*    (2006.01)
*H04L 12/54*    (2006.01)
*H04L 12/42*    (2006.01)
*H04L 12/403*   (2006.01)
*H04Q 11/00*    (2006.01)

(52) U.S. Cl. ................... 370/359; 370/395.71; 370/413; 370/415; 370/417; 370/419; 370/429; 370/453

(58) Field of Classification Search ........................ None
See application file for complete search history.

(56) References Cited

U.S. PATENT DOCUMENTS
6,791,992 B1    9/2004    Yun et al.

FOREIGN PATENT DOCUMENTS
EP    1009189 B1    6/2000
(Continued)

OTHER PUBLICATIONS
The ISLIP Scheduling Algorithm for Input-Queued Switches IEEE/ACM Transactions on Networking, vol. 7 No. 2 Apr. 1999 pp. 188-201 Mckeown, Nick.
(Continued)

*Primary Examiner* — Daniel J Ryman
*Assistant Examiner* — Nishant B Divecha

(57) ABSTRACT

A router for a network is arranged for guiding data traffic from one of a first plurality Ni of inputs (I) to one or more of a second plurality No of outputs (O). The inputs each have a third plurality m of input queues for buffering data. The third plurality m is greater than 1, but less than the second plurality No. The router includes a first selection facility for writing data received at an input to a selected input queue of the input, and a second selection facility for providing data from an input queue to a selected output. Pairs of packets having different destinations Oj and Ok are arranged in the same queue for a total number of Nj,k inputs, characterized in that Nj,k<N for each j,k.

6 Claims, 5 Drawing Sheets

FOREIGN PATENT DOCUMENTS

Figure 1:
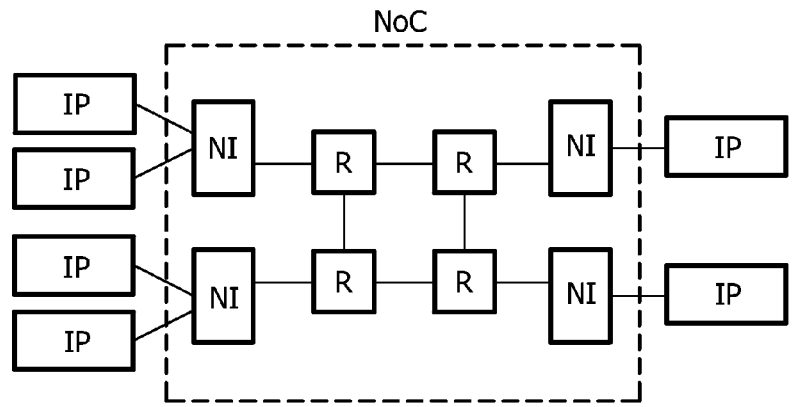

EP    1198098 A2 *  4/2002
EP    1198098 B1    4/2002

OTHER PUBLICATIONS

Throughput Analysis of Multiple Input-Queuing in ATM Switches Mason, L., and Casaca, A (Eds.): Broadband Communications (Chapman and Hall, London, UK, 1996), pp. 382-393 Kolias, C., and Kleinrock, L.

The Odd-Even ATM Switch IEICE Transactions on Communications, Communications Society, Tokyo, JP, vol. E81-B, No. 2 Feb. 1998, pp. 244-250 Kolias C et al.

* cited by examiner

| N=6 | output | | | | | |
|---|---|---|---|---|---|---|
| Input | 0 | 1 | 2 | 3 | 4 | 5 |
| 0 | 0 | 1 | 1 | 1 | 0 | 0 |
| 1 | 0 | 1 | 1 | 0 | 1 | 0 |
| 2 | 0 | 1 | 1 | 0 | 0 | 1 |
| 3 | 0 | 1 | 0 | 1 | 1 | 0 |
| 4 | 0 | 0 | 1 | 1 | 1 | 0 |
| 5 | 0 | 0 | 0 | 1 | 1 | 1 |

| N=8 | output | | | | | | | |
|---|---|---|---|---|---|---|---|---|
| Input | 0 | 1 | 2 | 3 | 4 | 5 | 6 | 7 |
| 0 | 0 | 1 | 1 | 1 | 1 | 0 | 0 | 0 |
| 1 | 0 | 1 | 1 | 0 | 0 | 1 | 1 | 0 |
| 2 | 0 | 1 | 0 | 1 | 0 | 1 | 0 | 1 |
| 3 | 0 | 1 | 0 | 0 | 1 | 0 | 1 | 1 |
| 4 | 0 | 0 | 1 | 1 | 0 | 0 | 1 | 1 |
| 5 | 0 | 0 | 1 | 0 | 1 | 1 | 0 | 1 |
| 6 | 0 | 0 | 0 | 1 | 1 | 1 | 1 | 0 |
| 7 | 0 | 1 | 1 | 0 | 1 | 1 | 0 | 0 |

| N=10 | output | | | | | | | | | |
|---|---|---|---|---|---|---|---|---|---|---|
| Input | 0 | 1 | 2 | 3 | 4 | 5 | 6 | 7 | 8 | 9 |
| 0 | 0 | 1 | 1 | 1 | 1 | 1 | 0 | 0 | 0 | 0 |
| 1 | 0 | 1 | 1 | 1 | 0 | 0 | 1 | 1 | 0 | 0 |
| 2 | 0 | 1 | 1 | 1 | 0 | 0 | 0 | 0 | 1 | 1 |
| 3 | 0 | 0 | 0 | 0 | 1 | 1 | 1 | 1 | 1 | 0 |
| 4 | 0 | 1 | 0 | 0 | 1 | 1 | 1 | 0 | 0 | 1 |
| 5 | 0 | 0 | 1 | 1 | 1 | 1 | 1 | 0 | 0 | 0 |
| 6 | 0 | 0 | 1 | 1 | 1 | 0 | 0 | 1 | 0 | 1 |
| 7 | 0 | 0 | 1 | 0 | 0 | 1 | 1 | 1 | 0 | 1 |
| 8 | 0 | 1 | 0 | 1 | 0 | 1 | 1 | 1 | 0 | 0 |
| 9 | 0 | 1 | 1 | 0 | 1 | 0 | 0 | 1 | 1 | 0 |

FIG.6

ROUTER, NETWORK COMPRISING A ROUTER, METHOD FOR ROUTING DATA IN A NETWORK

Networks are a practical architecture to couple a plurality of systems together in a flexible way. Such a network can for example be a local area network, which couples an arbitrary number of computer systems to each other. Furthermore, NoCs (Networks on chip) are emerging as a possible solution for future on-chip interconnects between IP blocks (Intellectual Property blocks). IP blocks are modules having some specific functions (e.g. CPUs, Memory's, DSPs). A network comprises at least one router, and a plurality of functional units or blocks that communicate to each other. Networks as compared to other solutions (e.g buses) in that they are easily scalable when the number of blocks increases.

The functional units are preferably coupled to the routers via a network interface. The network interface provides at least two main functions: (i) translation of the block native protocol into a protocol suitable for the network (network protocol) and (ii) provide extra communication properties and/or services (e.g. QoS, flow control) to the communication. A block directly connected to the router would have to implement all this functionality itself. On the other hand the network may comprise modules, such as a memory controller, which provide these functions themselves. A common management of the communication with the network protocol and the management of the memory may be advantageous to the access rate of the memory.

In the network routers have to manage a plurality of data traffic streams that may block each other. For example, traffic at the output of the buffer may be blocked, because it is waiting for acceptance by the following router or because two inputs want to go to the same output (contention).

Several queuing strategies are known to buffer blocked traffic. These are: Input queuing. Each input of the router has one queue.

Output queuing. Each output of the router has a separate queue for data coming from each of the inputs.

Virtual output queuing. Each input has a separate queue for data destined for each of the outputs.

Input queuing has the disadvantage that the throughput is relatively low due to so called head of line (HOL) blocking. HOL blocking occurs when data in the front end of the queue is waiting for transmission to an output. This in turn blocks transmission of the other data in the queue, even if this other data has a free output as destination.

This problem is overcome by output queuing and virtual output queuing. However, both these solutions require a large amount of memory to implement the queues.

Multiple input queuing is a solution that attempts to obtain a reasonable throughput with a limited amount of memory. This is in particular important for on-chip networks, as memory is a scarce resource on chip. In the case of multiple input queuing the inputs each have a plurality of queues. The traffic arriving at an input is distributed over the queues according to its destination. A known way to distribute incoming traffic is described by Kolias, C. and Kleinrock, L., Throughput analysis of multiple input queuing in ATM switches". In MASON, L., and Casaca, A. (Eds.): Broadband communications (Chapman & Hall, London, UK, 1996), pp. 382-393. Therein it is proposed to distribute the traffic over a first and a second queue according to a so-called odd-even rule. This rule assigns packets destined for odd numbered queues to the first queue, and packets having an even numbered destination to the second queue. In this way streams with an odd numbered destination do not block streams with an even numbered destination. Multiple input queuing requires a significantly smaller amount of memory than output queuing or virtual output queuing, while the throughput is still significantly improved as compared to (single) input queuing.

It is a purpose of the invention to provide a router for a network that further improves the throughput, without increasing the memory requirements.

In accordance with the invention this purpose is achieved by claim 1.

The measure according to the invention is based on the following insight.

The throughput of the router depends on the number of inputs for which the data can be transmitted. If each time a packet of data can be transmitted from each input to an output the throughput is 1. If on average a packet of data can be transmitted from n of the Ni inputs to an output the throughput is n/Ni. The throughput can be calculated by a weighted average of the fraction of packets that can be transmitted.

To that end the state of a router is defined as a matrix O where $O=\{o_{ij}\}$, wherein $o_{ij}$ indicates the output that is the destination of the HOL packet of queue j at input Ii. The throughput $$T = \sum_{n=1}^{N_i} p_n \frac{n}{N_i},$$

wherein $p_n$ is the probability that a state occurs wherein a fraction n/Ni of the packets is transmitted to an output.

For example, a router having 4 inputs, 4 outputs and 2 queues per input has the matrix $$\begin{pmatrix} o_{00} & o_{10} & o_{20} & o_{30} \\ o_{01} & o_{11} & o_{21} & o_{31} \end{pmatrix}$$

If such a router uses the odd-even rule to distribute the input-traffic over the queues it has 4 states in which only two input packets can be transmitted to their destination at a time. These, which are said to have a matching of 2, are:

$$\begin{pmatrix} 1 & 1 & 1 & 1 \\ 0 & 0 & 0 & 0 \end{pmatrix}, \begin{pmatrix} 3 & 3 & 3 & 3 \\ 0 & 0 & 0 & 0 \end{pmatrix}, \begin{pmatrix} 1 & 1 & 1 & 1 \\ 2 & 2 & 2 & 2 \end{pmatrix}, \begin{pmatrix} 3 & 3 & 3 & 3 \\ 2 & 2 & 2 & 2 \end{pmatrix}$$

There are also 72 states having a matching of 3 and 180 states with a matching of 4. These amount to a total number of 256 states.

Consequently the throughput is $$\frac{4}{256}\frac{2}{4} + \frac{72}{256}\frac{3}{4} + \frac{180}{256}\frac{4}{4} = 0.922$$

It has been recognized by the inventors that the probability is relatively high that the queues have a HOL packet with the same destination, and that this probability can be decreased by reducing the correlation between the assignment of packets with different destinations.

This is realized by an assignment of the packets to the queues that not only depends on the destination of the packets, but also on the source of the packets. In one example of such an assignment according to the invention the assigned queue number is ((k div m)+i)mod m, wherein k is the number of the output that is the destination, and i is the input number.

It can be seen that this assignment better distributes the co-occurrence of pairs of packets having different destinations over the queues of the inputs. It can be shown that the number of inputs for which a pair j,k of packets is in the same queue is N−m. This in turn reduces the number of bad states wherein only a low number of packets can be handled. In case of a uniform traffic distribution, i.e. each input of the router receives on average the same number of packets per time unit, and the destinations of these packets are equally distributed over the outputs, an optimal throughput can be obtained if each pair of destinations is assigned to the same queue for approximately the same number of inputs, i.e.

$$\mathrm{MAX}_{j,k}(N_{j,k}) - \mathrm{MIN}_{j,k}(N_{j,k}) \leq 1 \text{ or } N_{j,k} \in \{\lfloor Nav \rfloor, \lceil Nav \rceil\},$$

where pairs of packets having different destinations $O_j$ and $O_k$ are arranged in the same queue for a total number of $N_{j,k}$ inputs and on the average each output pair is in the same queue at Nav inputs.

The value for Nav can be calculated as follows from the number of inputs Ni, No and the number of queues m per input. Because there are m queues there will be $$\frac{No}{m}$$

outputs per queue. Therefore there are $$\binom{No/m}{2}$$

pairs of outputs in each queue. Each input then has $$m\binom{No/m}{2}$$

pairs of outputs, and Ni inputs have room for $$Ni.m\binom{No/m}{2}$$

pairs. In total there are of course $$\binom{No}{2}$$

output pairs, and therefore, on the average each output pair is in the same queue at $$Nav = \frac{Ni.m\binom{No/m}{2}}{\binom{No}{2}}$$

$$= \frac{Ni(No-m)}{m(No-1)} \text{ inputs.}$$

Situations are possible, wherein the traffic distribution is not uniform. In this case the assignment of the queues to the traffic may be adapted to the traffic distribution as follows:

Suppose $\lambda_{i,k}$ is the relative intensity of the data traffic from input Ii to output Ok, and $\epsilon_{ij,k}$ is 1 if two packets both arriving at input Ii and having output Oj and Ok as destination respectively are assigned to the same queue, and is 0 if they are not assigned to the same queue. Then an optimal throughput is achieved if the the difference $$\max_j \sum_{k=1}^N \varepsilon_{i,j,k} * \lambda_{i,k} - \min_j \sum_{k=1}^N \varepsilon_{i,j,k} * \lambda_{i,k}$$

is minimized for each i.

Figure 2A:
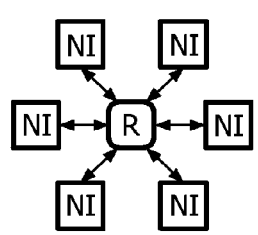
Figure 2B:
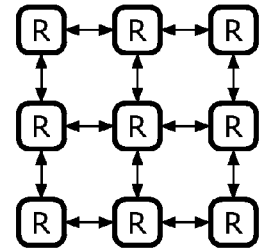
Figure 3:
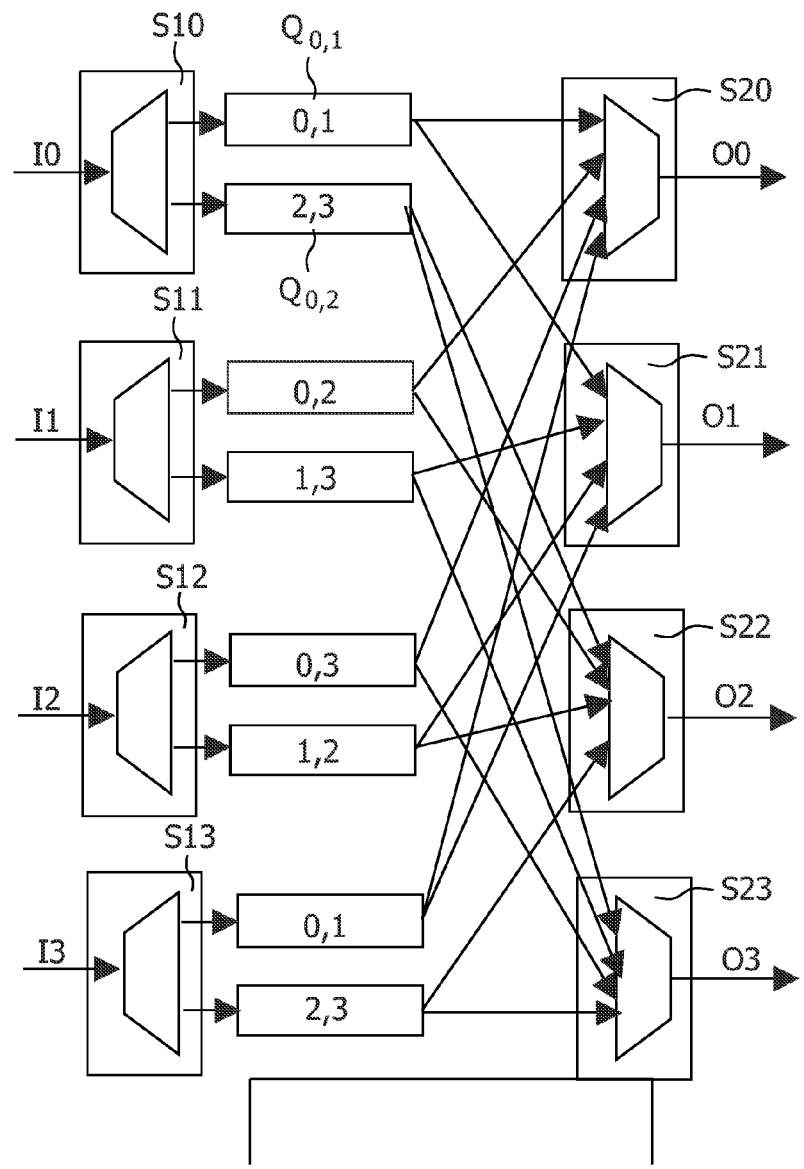
Figure 4:
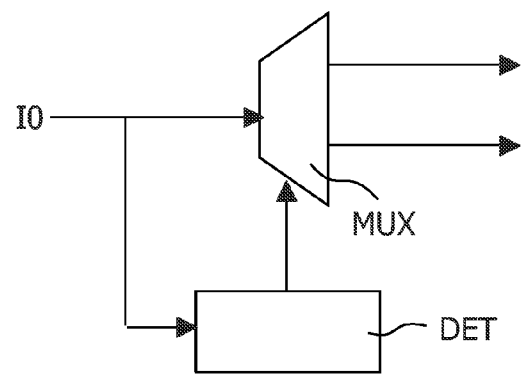
Figure 5:
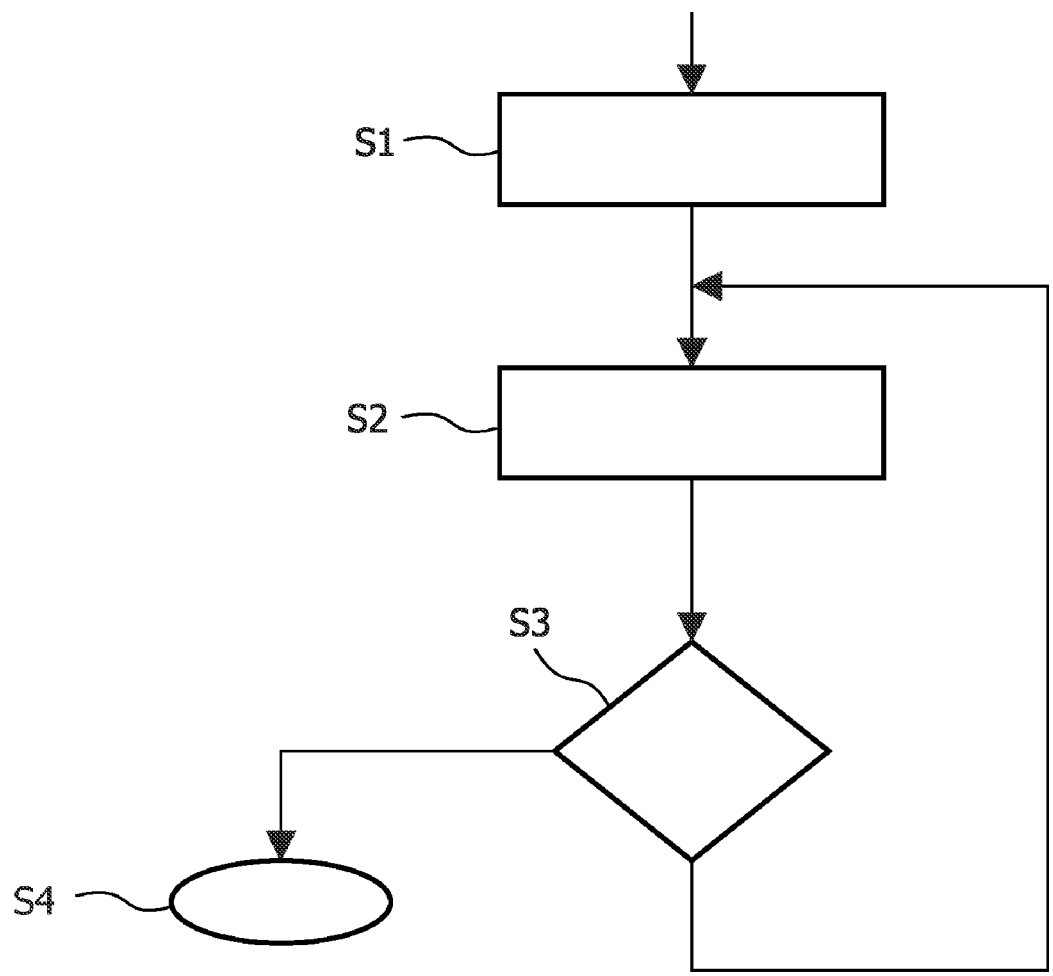
Figure 7:
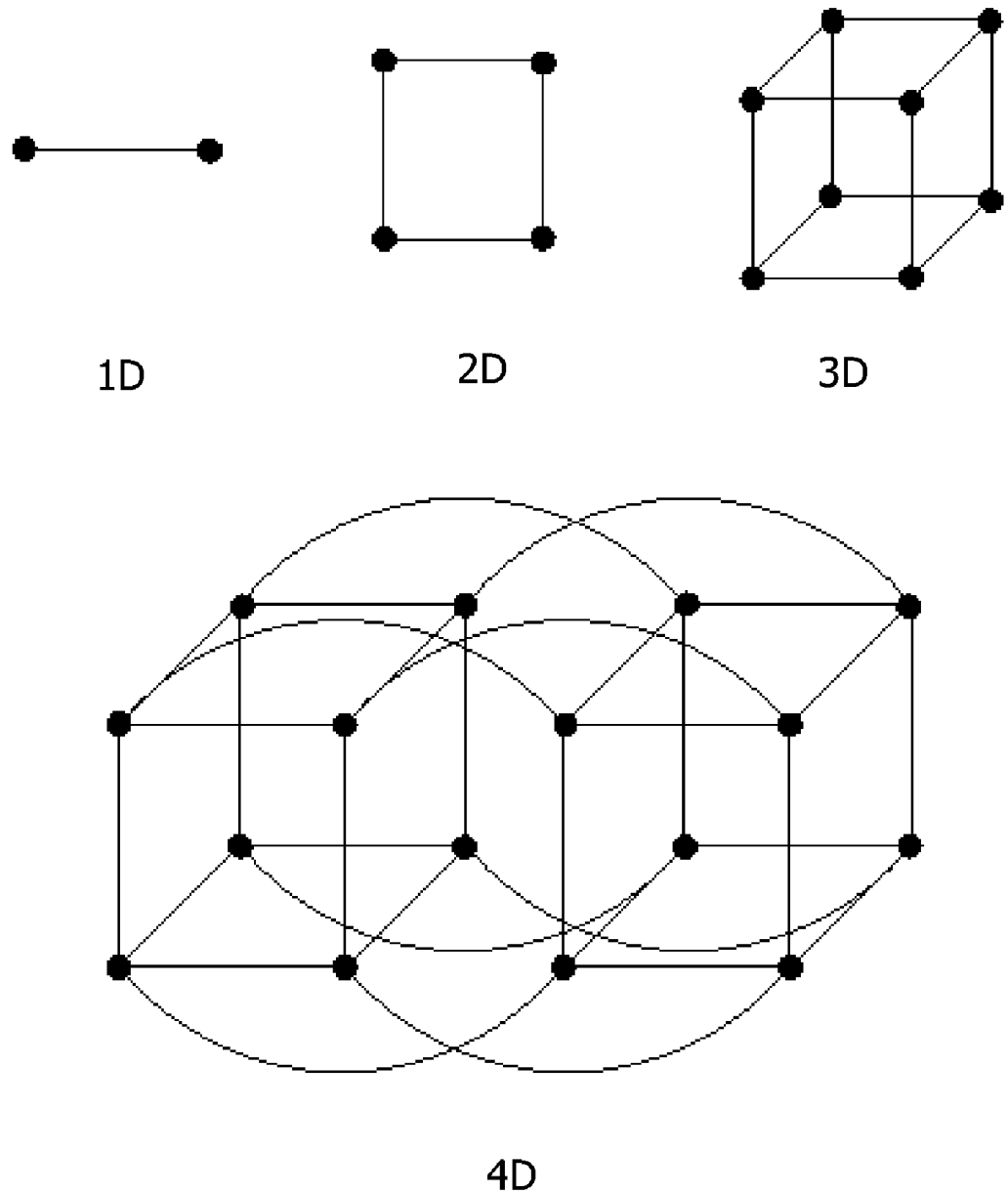

These and other aspects of the invention are described in more detail with reference to the drawings. Therein FIG. 1 shows an example of a network in which the present invention is applicable, FIG. 2 shows various topologies for networks FIG. 3 shows a router in more detail, FIG. 4 shows in more detail a portion of the router, FIG. 5 shows an algorithm for computing how to assign the queues for each input, FIG. 6 shows examples of optimal assignments of queues according to the invention, FIG. 7 shows a further topology for a network.

FIG. 1 shows an example of a network. In the example shown, the network is a network on chip (NoC). The network comprises a plurality of routers R, here 4 routers, that are interconnected, here in a torus topology. Each of the routers is connected to a network interface NI. Each network interface NI on its turn, is connected to one or more functional units also denoted as IP blocks. The network interfaces translate the information from the IP blocks to information that can be handled by the network, and likewise translate the traffic from the network into information acceptable to the IP blocks. For example the IP blocks may use a higher level protocol such as OCP, AXI or DTL, while the network uses a lower level protocol which for transporting data into packets. However, if the IP blocks and the network use the same protocol, the network interfaces are superfluous. Various network topologies are possible as is illustrated in FIG. 2. For clarity reasons all parts of the figure, except from part 2a, only show the routers. Physically the torus may either be implemented as shown in FIG. 2d or FIG. 2e. In the physical implementation of FIG. 2d mutually succeeding routers R are closely arranged to each other, but the connection between the first and the last router is relatively long. In the implementation of FIG. 2e the connections between the routers have substantially the same length.

Apart from the torus topology various other topologies are possible. In the fully connected network shown in FIG. 2a all functional units NI are coupled to the same router R. Alternatively as shown in FIG. 2b a plurality of routers may be arranged in a 2D mesh, wherein each router is coupled to its nearest neighbours.

Figure 2C:
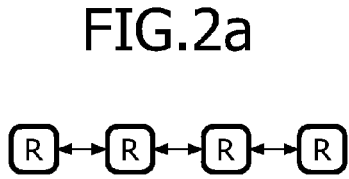
Figure 2D:
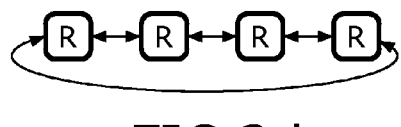
Figure 2E:
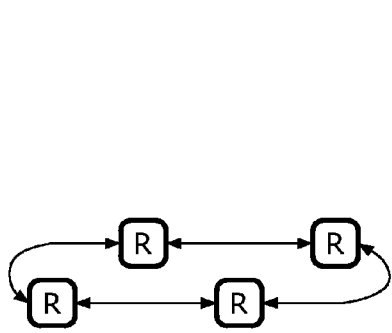
Figure 2F:
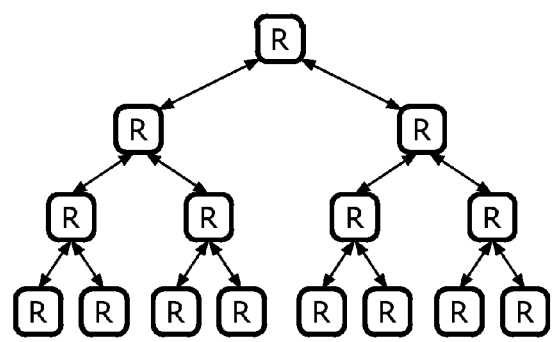

In a linear array, as shown in FIG. 2c, the routers are arranged in a chain. Each router, except the first and last one, is coupled to a preceding and a succeeding router. The torus topology can be considered as a linear array having its ends coupled together. A still further arrangement, shown in FIG. 2f is a tree, for example a binary tree. Therein the routers are hierarchically organized. Each router, except the lowest level routers, can communicate with two or more lower level routers. Also each router, except the highest-level router can communicate with one higher-level router. As the highest-level routers also have to manage the largest data stream, the tree is usually implemented as a so-called fat tree, wherein the transmission capacity between the higher-level routers is relatively higher compared to the transmission capacity between the lower level routers. This is due to the fact that a router has to handle the data traffic of the subtrees coupled thereto. The higher the level of the router the larger the size of the subtrees. To prevent that a bottleneck occurs, in particular in the highest router, the bandwidth of the connections between the routers is adapted to this traffic pattern e.g. by connecting the routers at the top of the tree with more wires at the top than at the bottom, resulting in the fat tree topology.

A further topology is a so-called hypercube. A hypercube network topology organizes the topology space into a logical n-dimensional hypercube, see FIG. 7. Two well-known properties characterizing this kind of topologies are: (a) every node (router) on the network is surrounded by logN neighbours and (b) the longest route within a hypercube is logN. Where N is the number of nodes in the hypercube. The main disadvantage is the difficulties to translate this kind of topologies into a physical hardware layout.

FIG. 3 shows a router in more detail. The router comprises a first plurality of inputs, in this case the four inputs I0,I1,I2,I3 and a second plurality of outputs O1, O2, O3, O4. In this case, the second plurality is equal to the first plurality. This is a practical choice, because a source, which transmits data usually, also needs to receive data. However, the router may alternatively have mutually different numbers of outputs and inputs. Each of the inputs is connected to a selection element, which forwards the data received at the inputs to one of a third plurality of input queues, e.g. queues $Q_{0,1}$ and $Q_{0,2}$ for input I0. The selection elements S10, S11, S12, S13 together form a first selection facility. In the embodiment shown, each input has two input queues. Any number of outputs No may be combined with any number of input queues m, e.g. No=4, m=2; No=6,m=2; No=6,m=3;No=12,m=2; etc, the number of input queues is preferably, an increasing function of the number of outputs for example, the number of input queues is approximately equal to the square root of the number of outputs.

The router includes a second selection facility for guiding data from a selected one of two or more input queue to an output. In the embodiment shown, the second selection facility comprises second selection elements S20, S21, S22, S23 coupled to each output. The second selection facility may operate according to a known principle, for example using the algorithm described in McKeown, "The iSLIP scheduling algorithm for input queued switches" IEEE/ACM transactions on networking, Vol. 7, No. 2, April 1999, pp.188-201.

FIG. 4 shows one of the first selection elements in more detail. The first selection element comprises the detector DET, which detects the destination for each input packet, and which controls a multiplexing element MUX. The multiplexing element MUX forwards the packet to one of a plurality of outputs, in response to the control signal of the detection element. In the algorithm described by Kolias, the operation of the selection elements may be schematically represented by a table as follows.

| prior art | Output | | | |
|---|---|---|---|---|
| Input | 0 | 1 | 2 | 3 |
| 0 | 0 | 1 | 0 | 1 |
| 1 | 0 | 1 | 0 | 1 |
| 2 | 0 | 1 | 0 | 1 |
| 3 | 0 | 1 | 0 | 1 |

Traffic arriving at each input is handled in the same way. According to the known algorithm, the odd-even rule referred to above, the assigned queue number is 0 for packets having an even-numbered output as destination, and is 1 for packets having an odd numbered output as destination. This rule is applied at each input.

The following table shows the operation of the known algorithm in a different way. In the table it is indicated whether input packets having different output as destination are buffered in the same queue. From this table it can be seen that packets having outputs 0 and 2 as destination, as well as packets having destination 1 and 3, always are buffered in the same queue. Other pairs of packets are never buffered in the same queue. In other words, pairs of packets, herein denoted as destination pairs, having mutually different destinations Oj and Ok are either arranged in the same queue for all 4 inputs or not arranged in the same queue at all.

| prior art | Destination pairs | | | | | |
|---|---|---|---|---|---|---|
| input | 01 | 02 | 03 | 12 | 13 | 23 |
| 0 | 0 | 1 | 0 | 0 | 1 | 0 |
| 1 | 0 | 1 | 0 | 0 | 1 | 0 |
| 2 | 0 | 1 | 0 | 0 | 1 | 0 |
| 3 | 0 | 1 | 0 | 0 | 1 | 0 |
| Total | 0 | 4 | 0 | 0 | 4 | 0 |

According to the present invention, the total number $N_{j,k}$ of inputs for which a pair of packets having mutually different destinations Oj and Ok are arranged in the same queue for a total number of N inputs should be less than N.

In a first embodiment of the invention Inv1 the packets are distributed over the input queues according to the following rule:

The assigned queue number is ((k div m)+i)mod m, wherein k is the destination (output) number, and i is the input number. This assignment is schematically shown for router having four inputs and four outputs and two queues for each input.

The following table shows for each row, if a pair of packets with destinations Oj and Ok is buffered in the same queue (1) or not (0).

| Inv1(4, 2) | Destination pairs | | | | | |
|---|---|---|---|---|---|---|
| input | 01 | 02 | 03 | 12 | 13 | 23 |
| 0 | 0 | 1 | 0 | 0 | 1 | 0 |
| 1 | 0 | 0 | 1 | 1 | 0 | 0 |
| 2 | 0 | 1 | 0 | 0 | 1 | 0 |
| 3 | 0 | 0 | 1 | 1 | 0 | 0 |
| Total | 0 | 2 | 2 | 2 | 2 | 0 |

According to the present invention, the total number that pairs of packets having mutually different destinations $O_j$ and $O_k$ are arranged in the same queue for a total number of N inputs should be less than N. More in particular the total number is at most N−m.

In this embodiment of the invention there are only two states with a maximum matching of two, namely (0,2,2,0,2, 0,02) and (1,3,3,1,3,1,1,3). 68 states would have a maximum matching of three and 186 states have a maximum matching of 4. The expected throughput in each state is equally probable and when using a scheduling algorithm which finds a maximum matching the average throughput is estimated at $$\frac{2}{4} \cdot \frac{2}{256} + \frac{3}{4} \cdot \frac{68}{256} + \frac{4}{4} \cdot \frac{186}{256} = 0.930$$

this is an increased throughput as compared to the throughput of the known router using the odd-even rule.

An even further improvement is provided by the second embodiment Inv2 of the present invention. According to this embodiment the difference between the total number $N_{j,k}$ that pairs of packets having mutually different destinations $O_j$ and $O_k$ are arranged in the same queue for a total number of N inputs should be at most 1.

This is illustrated with the following example:

| Inv2(4, 2) | Output | | | |
|---|---|---|---|---|
| Input | 0 | 1 | 2 | 3 |
| 0 | 0 | 0 | 1 | 1 |
| 1 | 0 | 1 | 0 | 1 |
| 2 | 0 | 1 | 1 | 0 |
| 4 | 0 | 0 | 1 | 1 |

The following table shows the number of rows $N_{j,k}$ for which packets having outputs $O_j$ and $O_k$ as destinations are assigned to the same queue.

| Inv2(4, 2) | Destination pairs | | | | | |
|---|---|---|---|---|---|---|
| input | 01 | 02 | 03 | 12 | 13 | 23 |
| 0 | 1 | 0 | 0 | 0 | 0 | 1 |
| 1 | 0 | 1 | 0 | 0 | 1 | 0 |
| 2 | 0 | 0 | 1 | 1 | 0 | 0 |
| 3 | 1 | 0 | 0 | 0 | 0 | 1 |
| Total | 2 | 1 | 1 | 1 | 1 | 2 |

In this embodiment of the invention at least 3 packets can be transmitted each cycle. More in particular there are 64 out of 256 states with a matching of 3, and 192 states with a matching of 4. Accordingly the average throughput is estimated at:

$$\frac{3}{4} \cdot \frac{64}{256} + \frac{4}{4} \cdot \frac{192}{256} = 0.938$$

As set out above the expected throughput pairs of packets arriving at input $I_i$ and having destinations j,k, i.e. having outputs $O_j$ and $O_k$ as destination have approximately the same probability of being arranged in the same queue for each pair j,k. In the sequel an algorithm, with reference to FIG. 5 is described which calculates an assignment policy for a router with Ni inputs, No outputs and m queues per row in a modest number of computations.

First, in step S1, without loss of generality an arbitrary choice can be made from all assignments for a single input. E.g. for example, for the first input I0 traffic having output $O_k$ as destination may be assigned to queue k mod m. Then $c_{0j,k}=1$ if j−k mod m=0 and $c_{0j,k}=0$ if j−k mod m≠0.

Now, suppose an assignment is found for the first (r−1) inputs, e.g. r=2. Hence, $c_{i,j,k}$ is fixed for all i<=r−1 and all output pairs 0<=j<k.<No. Then, in step 2 S2, for the r-th input the assignment is selected from the set of possible assignments that minimizes the following function:

$$\sum_{j<k} \left| \sum_{i=0}^{r} c_{i,j,k} - \frac{r(N_o - m)}{m(N_o - 1)} \right|.$$

After this step $c_{ij,k}$ is fixed for all pairs j,k with i<=r

In step S3 it is verified whether r<N−1. If this is the case step S2 is repeated, otherwise the algorithm is finished in step S4.

The tables in FIG. 6 shows some examples of optimal assignments of input queues according to the invention for routers having N=6,8 and 10 inputs and the same number of outputs, and two input queues for each input. In these tables it is indicated to which queue (0 or 1) a packet having input $I_i$ and output $O_k$ is assigned.

The above calculation presumes that the states occurring in the router are independent. In practice it appears that so called bad states appear to repeat, so that the throughput which is measured in practice, the saturation throughput is lower that the average throughput. The following table shows the saturation throughput for three queue assignments: according to the known odd-even rule, according to the first embodiment of the invention and according to the second embodiment of the invention. The table shows that also the saturation throughput is improved by the queue assignment according to the invention, as compared to the known rule for queue assignment, the odd-even rule.

| | Queue assignment | | |
|---|---|---|---|
| N | prior art | Inv1 | inv2 |
| 4 | 0.868 | 0.892 | 0.918 |
| 6 | 0.826 | 0.846 | 0.865 |
| 8 | 0.806 | 0.823 | 0.842 |
| 10 | 0.795 | 0.809 | 0.822 |

Although the invention is illustrated for a network on-chip it is equally applicable to of chip networks such as local area networks are wide area networks. In network on chips often the routers have 4-6 inputs and 2 queues per buffer. Off-chip networks often use larger routers, e.g. having 12-16 inputs.

The most advantage is obtained however, in a network on-chip as in the latter type of networks the memory required for queues is an expensive resource, and the present invention utilizes this resource as efficient as possible.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim in numerating several means, several of these means can be embodied by one and the same item of hardware. The mere fact that certain measures are resided in mutually different dependent claims does not indicate that a combination of these measures cannot be used to advantage.

Furthermore, any reference signs in the claims shall not constitute as limiting the scope of the claims

The invention claimed is:

1. Router for a network, the router being arranged for guiding data traffic from one of a first plurality Ni of inputs (I) to one or more of a second plurality $N_o$ of outputs (O), the inputs each having a third plurality m of input queues for buffering data, the third plurality m being greater than 1, but less than the second plurality $N_o$, the router comprising:
a first selection facility for writing data received at an input to a selected input queue of said input,
a second selection facility for providing data from an input queue to a selected output,
the first selection facility arranges pairs of packets having different destinations $O_j$ and $O_k$ in the same queue for a total number of $N_{j,k}$ inputs, characterized in that $N_{j,k}$<N with N=$N_i$ for each j,k, characterized in that the difference $$\max_j \sum_{k=1}^{N} \varepsilon_{i,j,k} * \lambda_{i,k} - \min_j \sum_{k=1}^{N} \varepsilon_{i,j,k} * \lambda_{i,k}$$

is minimized for each i, wherein $\lambda_{i,k}$ is the intensity of the data traffic from input $I_i$ to output $O_k$ and $\varepsilon_{i,j,k}$ is 1 if two packets both arriving at input $I_i$ and one having outputs $O_j$ and $O_k$ as destinations respectively are assigned to the same queue, and is 0 if they are not assigned to the same queue.

2. Router according to claim 1, characterized in that Nj,k<=N−m for each j,k.

3. Router according to claim 2, characterized in that the difference $$\text{MAX}_{j,k}(N_{j,k}) - \text{MIN}_{j,k}(N_{j,k}) \leq 1.$$

4. System on chip having a network comprising at least one router according to claim 1 which interconnects a plurality of functional units.

5. Computer network which remotely couples a plurality of computer systems, comprising at least one router according to claim 1.

6. Method for routing data traffic from one of a first plurality $N_i$ of inputs to one or more of a second plurality $N_o$ of outputs, which method comprises the following steps:
for a packet arriving at an input selecting one of a plurality m of input queues for buffering the packet,
selecting which packets at an output of the queues are to be forwarded to the outputs,
arranging pairs of packets having different destinations $O_j$ and $O_k$ in the same queue for a total number of $N_{j,k}$ inputs characterized in that $N_{j,k}$<Ni for each j,k, characterized in that the difference $$\max_j \sum_{k=1}^{N} \varepsilon_{i,j,k} * \lambda_{i,k} - \min_j \sum_{k=1}^{N} \varepsilon_{i,j,k} * \lambda_{i,k}$$

is minimized for each i, wherein $\lambda_{i,k}$ is the intensity of the data traffic from input $I_i$, to output $O_k$ and $\varepsilon_{i,j,k}$ is 1 if two packets both arriving at input $I_i$, and one having outputs $O_j$ and $O_k$ as destinations respectively are assigned to the same queue, and is 0 if they are not assigned to the same queue.

* * * * *